United States Patent
Tucker et al.

(10) Patent No.: US 9,575,333 B2
(45) Date of Patent: *Feb. 21, 2017

(54) COLORED CONTACT LENSES AND METHOD OF MAKING THE SAME

(71) Applicant: Novartis AG, Basel (CH)

(72) Inventors: Robert Carey Tucker, Suwanee, CA (US); Ellen A. Day, Alpharetta, GA (US); Sandra Corti, Suwanee, GA (US); Roland Schmieder, Friedrichsdorf (DE); Laura A. Creech, Atlanta, GA (US)

(73) Assignee: NOVARTIS AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/065,386

(22) Filed: Mar. 9, 2016

(65) Prior Publication Data

US 2016/0187672 A1 Jun. 30, 2016

Related U.S. Application Data

(63) Continuation of application No. 14/693,251, filed on Apr. 22, 2015, now Pat. No. 9,310,625, which is a (Continued)

(51) Int. Cl.
*G02C 7/04* (2006.01)
*B29D 11/00* (2006.01)

(52) U.S. Cl.
CPC ......... *G02C 7/046* (2013.01); *B29D 11/00903* (2013.01); *G02C 2202/16* (2013.01)

(58) Field of Classification Search
CPC .................................. G02B 7/04; G02B 7/046
(Continued)

(56) References Cited

U.S. PATENT DOCUMENTS 3,536,386 A 10/1970 Spivack
3,679,504 A 7/1972 Wichterle
(Continued)

FOREIGN PATENT DOCUMENTS

EP 0309154 A2 3/1989
EP 0472496 A2 2/1992
(Continued)

OTHER PUBLICATIONS

Authors: Lynn M. Matsuda, Constance L. Woldorff, Rodger T. Kame, Jon K. Hayashida Title: Clinical Comparison of Corneal Diameter and Curvature in Asian Eyes with Those of Caucasian Eyes Published: Optometry and Vision Science 1992, vol. 69, No. 1, pp. 51-54.

(Continued)

*Primary Examiner* — Scott J Sugarman
(74) *Attorney, Agent, or Firm* — Sheng-Hsin Hu

(57) ABSTRACT

The invention is directed to a colored contact lens designed for making a wearer's eyes to appear larger, bolder, and enhanced color while giving the wearers eyes a very natural appearance. A colored contact lens of the invention comprising a first print of a first color and a second print of a second color, wherein the first print consisting of an annular ring of gradient dot matrix, wherein the second print comprises a limbal ring and an outer starburst pattern, wherein the limbal ring surrounds the outer starburst pattern, wherein the annular ring and the limbal ring have a substantially identical outer diameter and the annular ring has a larger inside diameter than the limbal ring, the first color and the second color are different or the same, wherein the first print and the second print are concentric with the center of contact lens.

12 Claims, 7 Drawing Sheets

Related U.S. Application Data continuation of application No. 13/186,737, filed on Jul. 20, 2011, now Pat. No. 9,039,173.

(60) Provisional application No. 61/368,938, filed on Jul. 29, 2010.

(58) Field of Classification Search
USPC .............................. 351/159.02, 159.8–159.81
See application file for complete search history.

(56) References Cited

U.S. PATENT DOCUMENTS

| | | |
|---|---|---|
| 3,712,718 A | 1/1973 | LeGrand |
| 4,460,523 A | 7/1984 | Neefe |
| 4,582,402 A | 4/1986 | Knapp |
| 4,634,449 A | 1/1987 | Jenkins |
| 4,704,017 A | 11/1987 | Knapp |
| 4,719,657 A | 1/1988 | Bawa |
| 4,720,188 A | 1/1988 | Knapp |
| 4,744,647 A | 5/1988 | Meshel |
| 4,923,480 A | 5/1990 | Monestere |
| 4,981,487 A | 1/1991 | da Costa |
| 5,034,166 A | 7/1991 | Rawlings |
| 5,116,112 A | 5/1992 | Rawlings |
| 5,120,121 A | 6/1992 | Rawlings |
| 5,160,463 A | 11/1992 | Evans |
| 5,260,727 A | 11/1993 | Oksman |
| 5,302,978 A | 4/1994 | Evans |
| 5,414,477 A | 5/1995 | Jahnke |
| 5,936,705 A | 8/1999 | Ocampo |
| 5,963,298 A | 10/1999 | Bard |
| 6,030,078 A | 2/2000 | Ocampo |
| 6,132,043 A | 10/2000 | Atkins |
| 6,196,683 B1 | 3/2001 | Quinn |
| 6,315,410 B1 | 11/2001 | Doshi |
| 6,322,214 B1 | 11/2001 | Atkins |
| 6,337,040 B1 | 1/2002 | Thakrar |
| 6,488,375 B2 | 12/2002 | Streibig |
| 6,488,376 B1 | 12/2002 | Streibig |
| 6,494,575 B1 | 12/2002 | Jahnke |
| 6,523,953 B2 | 2/2003 | Jahnke |
| 6,733,126 B2 | 5/2004 | Streibig |
| 6,767,097 B2 | 7/2004 | Streibig |
| 6,786,597 B2 | 9/2004 | Streibig |
| 6,800,225 B1 | 10/2004 | Hagmann |
| 6,811,259 B2 | 11/2004 | Tucker |
| 6,824,267 B2 | 11/2004 | Streibig |
| 6,827,440 B2 | 12/2004 | Ocampo |
| 6,834,955 B2 | 12/2004 | Doshi |
| 6,880,932 B2 | 4/2005 | Doshi |
| 6,890,075 B2 | 5/2005 | Francis |
| 6,896,369 B2 | 5/2005 | Streibig |
| 6,929,367 B2 | 8/2005 | Jahnke |
| 7,048,375 B2 | 5/2006 | Doshi |
| 7,210,778 B2 | 5/2007 | Ocampo |
| 7,246,903 B2 | 7/2007 | Bowers |
| 7,255,438 B2 | 8/2007 | Atkins |
| 7,267,846 B2 | 9/2007 | Doshi |
| 7,278,736 B2 | 10/2007 | Ocampo |
| 7,296,891 B2 | 11/2007 | Streibig |
| 7,306,333 B2 | 12/2007 | Tucker |
| 7,354,959 B2 | 4/2008 | Tucker |
| 7,384,590 B2 | 6/2008 | Kelly |
| 7,387,759 B2 | 6/2008 | Kelly |
| 7,438,412 B2 | 10/2008 | Ocampo |
| 7,549,742 B2 | 6/2009 | Doshi |
| 7,634,715 B2 | 12/2009 | Hertzfeld |
| 7,641,336 B2 | 1/2010 | Dukes |
| 8,770,747 B2 | 7/2014 | Corti |
| 2002/0030788 A1 | 3/2002 | Doshi |
| 2002/0039172 A1 | 4/2002 | Ocampo |
| 2002/0057416 A1 | 5/2002 | Streibig |
| 2002/0080327 A1 | 6/2002 | Clark |
| 2002/0191152 A1 | 12/2002 | Hsu |
| 2003/0025872 A1 | 2/2003 | Ocampo |
| 2003/0025873 A1 | 2/2003 | Ocampo |
| 2003/0030773 A1 | 2/2003 | Ocampo |
| 2003/0071964 A1 | 4/2003 | Doshi |
| 2003/0117576 A1 | 6/2003 | Thakrar |
| 2003/0169401 A1 | 9/2003 | Ocampo |
| 2004/0119939 A1 | 6/2004 | Clark |
| 2004/0130676 A1 | 7/2004 | Doshi |
| 2005/0068491 A1 | 3/2005 | Ocampo |
| 2005/0168688 A1 | 8/2005 | Doshi |
| 2005/0237484 A1 | 10/2005 | Ocampo |
| 2005/0254002 A1 | 11/2005 | Dukes |
| 2005/0272833 A1 | 12/2005 | Doshi |
| 2006/0114410 A1 | 6/2006 | Ocampo |
| 2006/0181676 A1 | 8/2006 | Tucker |
| 2007/0263170 A1 | 11/2007 | Ocampo |
| 2008/0225058 A1 | 9/2008 | Hertzfeld |
| 2008/0278680 A1 | 11/2008 | Ocampo |
| 2010/0103370 A1 | 4/2010 | Ocampo |

FOREIGN PATENT DOCUMENTS

| | | |
|---|---|---|
| EP | 0982617 A1 | 3/2000 |
| EP | 1226465 B1 | 7/2002 |
| GB | 2202540 A | 9/1988 |
| GB | 2440558 A | 2/2008 |
| WO | 9946630 A1 | 9/1999 |
| WO | 02057837 A2 | 7/2002 |
| WO | 2004061520 A1 | 7/2004 |
| WO | 2004097503 A1 | 11/2004 |
| WO | 2005081048 A2 | 9/2005 |
| WO | 2006023664 A1 | 3/2006 |
| WO | 2007013857 A1 | 2/2007 |

OTHER PUBLICATIONS

PCT International Search Report dated Nov. 2, 2011 International Application No. PCT/EP2011/062397, International Filing Date, Jul. 20, 2011.

PCT Written Opinion of the International Searching Authority dated Nov. 2, 2011 International Application No. PCT/EP2011/062397, International Filing Date, Jul. 20, 2011.

COLORED CONTACT LENSES AND METHOD OF MAKING THE SAME

This application is a continuation of application Ser. No. 14/693,251 filed 22 Apr. 2015, which is a continuation of application Ser. No. 13/186,737 filed 20 Jul. 2011, now U.S. Pat. No. 9,039,173, which claims the benefits under 35 USC §119 (e) of U.S. provisional application No. 61/368,938 filed Jul. 29, 2010, incorporated by reference in its entirety.

The present invention relates to colored contact lenses capable of making a wearer's eyes bigger and bolder with enhanced contrast without changing the overall eye color or naturalness. The present invention also relates to methods for designing and manufacturing colored contact lenses of the invention.

BACKGROUND OF THE INVENTION

For cosmetic purposes, colored contact lenses having one or more colorants dispersed in the lens or printed on the lens are in high demand. These colored contact lenses enhance the natural beauty of the eye, or provide unique patterns on the iris of the wearer, or provide non-cosmetic patterns.

In general, there are two types of colored contact lenses. The first are contact lenses which use essentially transparent enhancement colors that allow the color of the natural iris to show through but combine with that natural color to produce a new appearance. Such transparent colored lenses are typically used to turn a light eye (e.g., green) to a slightly different hue (e.g., aqua). This class of colored lenses may not be able to change an underlying dark-colored brown iris to blue. The second category is the class of opaque colored lenses having a continuous opaque pattern that fully covers the iris or having an intermittent opaque pattern that does not fully cover the iris. Opaque colored contact lenses can effectively and substantially modify the wearer's eye color.

Certain contact lens consumers showed interest in enhancing their eyes without dramatically changing their natural eye color. They wanted their eyes to appear bolder, and larger-appearing for a more "youthful" appearance. However, these consumers did not want anyone to know they were wearing contact lenses, and any design would need to be natural.

Accordingly, there are still needs for colored contact lenses that are capable of making eyes bigger and bolder with enhanced contrast while maintaining the wearers natural underlying iris structure and color.

SUMMARY OF THE INVENTION

In one respect, the invention provides a colored contact lens, comprising a first print of a first color and a second print of a second color, wherein the first print is an annular ring of gradient dot matrix, wherein the second print comprises an outer starburst pattern and a limbal ring surrounding the outer starburst pattern, wherein the annular ring and the limbal ring have a substantially identical outer diameter and the annular ring has a larger inner diameter than that of the limbal ring, wherein the first color and the second color are different or the same, wherein the first print and the second print are concentric with the center of contact lens.

In another aspect, the invention encompasses a method for making a colored contact lens, comprising the steps of:
(a) providing a preformed contact lens; and
(b) applying a first print pattern of opaque colored dots of a first color onto a surface of at least one of the anterior and posterior surfaces of the contact lens,
wherein the first print is an annular ring of gradient dot matrix,
(c) applying a second print pattern of opaque colored dot of a second color onto the surface of the contact lens, wherein the second print comprises an outer starburst pattern and a limbal ring surrounding the outer starburst pattern, wherein the annular ring and the limbal ring have a substantially identical outer diameter and the annular ring has a larger inner diameter than that of the limbal ring, wherein the first color and the second color are different or the same, wherein the first print and the second print are concentric with the center of contact lens.

In still another aspect, the invention encompasses a method for making a colored contact lens, comprising the steps of:
(a) providing a mold including a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces;
(b) applying, by using pad-transfer or inkjet printing technique, a second print pattern of opaque colored dot of a second color to onto at least one of molding surfaces of a lens mold, wherein the second print comprises an outer starburst pattern and a limbal ring surrounding the outer starburst pattern, wherein the annular ring and the limbal ring have a substantially identical outer diameter and the annular ring has a larger inner diameter than that of the limbal ring,
(c) applying, by using pad-transfer or inkjet printing technique, a first print pattern of opaque colored dots of a first color onto the surface of the mold,
wherein the first print is an annular ring of gradient dot matrix,
wherein the first color and the second color are different or the same, wherein the first print and the second print are concentric with the center of contact lens.

These and other aspects of the invention will become apparent from the following description of the preferred embodiments taken in conjunction with the following drawings. As would be obvious to one skilled in the art, many variations and modifications of the invention may be affected without departing from the spirit and scope of the novel concepts of the disclosure.

DETAILED DESCRIPTION OF THE PREFERRED EMBODIMENTS

Figure 1:
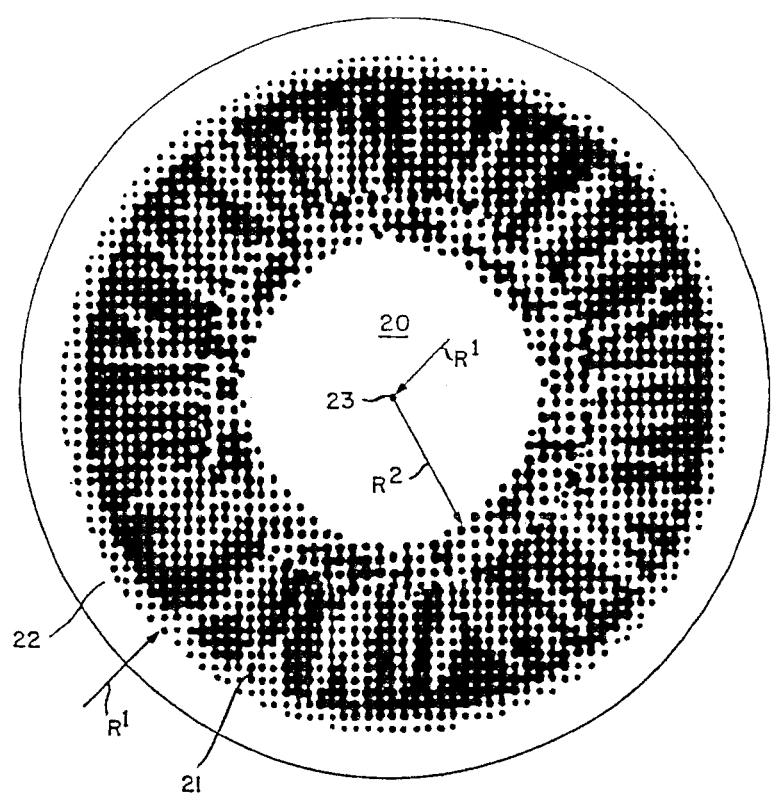
FIG. 1 illustrates a prior art contact lens.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term.

A "contact lens" refers to an object that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be tinted before printing any color patterns. A contact lens can be in a dry state or a wet state. "Dry State" refers to a soft lens in a state prior to hydration or the state of a hard lens under storage or use conditions. "Wet State" refers to a soft lens in a hydrated state.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye™ patterns, made-to-order (MTO) patterns, and the like; an inversion mark that allows a user to handle and easily insert a contact lens; a toric rotation mark, or contact lenses stock keeping units (SKUs), for example, either in forms of numbers or as bar codes. A color image can be a single color image or a multi-color image. A color image is preferably a digital image, but it can also be an analog image.

The term "eye color" refers to the color of the iris.

The term "ordinary viewer" is intended to mean a person having normal 20/20 version standing about 5 feet from a person wearing the lenses of the invention.

The term "non-opaque" as used herein is intended to describe transparent or translucent color or a part of the lens that is uncolored or colored with transparent or translucent coloring.

A "colored coat" refers to a coating on an object and having a color image printed therein.

A "colorant" means either one or more dyes or one or more pigments or a mixture thereof that is used to print a pattern of colored elements on a contact lens.

"Dye" means a substance that is soluble in a solvent and that is used to impart color. Dyes typically have low opacity and are nearly transparent or translucent. Dyes can cover both optical regions of contact lenses and non-optical regions of contact lenses.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment is heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various ironoxides; PR122, PY154, for violet, carbazole violet; for black, Monolith black C-K (CIBA Specialty Chemicals).

"Pearlescence" means having a pearly luster; resembling a pearl in physical appearance; or a color having a shiny, slightly reflective appearance.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allow the appearance to vary depending upon illumination and viewing conditions. The color is determined by the coating thickness, the refractive index and the angle of illumination. Optically thin coatings are also responsible for the rich, deep, glossy effect due to partial reflection from the metal oxide and partial transmission through the mica platelets. This class of pigment can provide pearly luster and iridescent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Ga., the pigments having the trade name "Flonac Lustre Colors"; and EM Industries, Inc. of Hawthorne, N.Y., the pigments having the trade name "Affair Lustre Pigments".

The term "pearlescently colored" as used herein is intended to describe an element of a colored pattern that is colored with a pearlescent colorant (i.e., containing at least one pearlescent pigment).

In the case of pearlescent pigments, it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlescent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

The term "shining effect" as used herein is intended to describe the effect that the amount of pearlescent pigment is high enough to provide eye appearance of reflection with a sparkling luster.

An "uneven or jagged or irregular border or peripheral edge" as used herein refers to a border or a peripheral edge on which positions have radial distances (i.e., from the lens center) which differ from each other by at least about 20%. A "substantially even border or peripheral edge" as used herein refers to a border or a peripheral edge on which positions have substantially constant radial distances (i.e., from the lens center), namely differing from each other less than 20%.

The term "percent of print coverage or dot coverage" refers to the portion of the total area within the region covered by the color dots as measured by using Adobe Photoshop (a graphics image editing software) to determine the number of pixels on an area. The percent of print coverage is calculated as follows:

% print coverage=[(number of pixels of dot coverage area)/(number of pixels of a total area)]×100

Total area=printed area+un-printed area

"Hydrogel" means a cross-linked polymer having equilibrium content between about 10 and 90 percent water.

A "lens-forming material" refers to a polymerizable composition which can be can be (cured (i.e., polymerized and/or crosslinked) thermally or actinically (i.e., by actinic radiation) to obtain a crosslinked polymer. Examples of actinic radiation are UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art such as: HEMA-based hydrogel and silicone hydrogel.

A "HEMA-based hydrogel" refers to a hydrogel obtained by copolymerization of a polymerizable composition comprising hydroxyethylmethacrylate (HEMA).

A "silicone hydrogel" refers to a hydrogel obtained by copolymerization of a polymerizable composition comprising at least one silicone-containing monomer or at least one silicone-containing macromer.

"Hydrophilic," as used herein, describes a material or portion thereof that will more readily associate.

A "print-on-mold process for producing colored contact lenses" refers to a process for molding a colored contact lens described in U.S. Pat. No. 5,034,166 to Rawlings et al. (herein incorporated by reference).

This invention is directed to a colored contact lens designed to enhance a wearer's natural eye color and make them bolder while providing a very natural appearance as perceived by the ordinary viewer.

For example, certain dark-eyed contact lens consumers have shown interest in enhancing their eyes without dramatically changing their natural eye color. They wanted their eyes to appear darker, bolder, and larger-appearing for a more "youthful" appearance. However, these consumers did not want anyone to know they were wearing contact lenses, and any design would need to be natural. Light-colored (i.e. blue or green) and medium-colored (i.e. hazel, light brown) contact lens consumers also show similar interest in enhancing their eyes dramatically, yet naturally, without changing their natural eye color.

It is discovered that such cosmetic effects (i.e., enhancing a wearer's eye color and make them bolder while providing a very natural appearance) can be achieved by placing a colored design on a contact lens to improve the contrast of the wearer's eye, particularly their limbus. This design can be applied by printing onto a contact lens through conventional means. This invention has illustrated certain designs and colors which provide this color on eye yet blends with the wearers natural eye color. The invention described here is a series of rings placed on top of each other to provide the desired effect. This first print layer is a diffuse pattern with gradient dot matrix which allows the underlying limbus and iris structure to be seen. The design of the first print of the present invention help to provide both attributes of a natural looking pattern and a high contrast with the wearer's natural eye, especially when the first print is superimposed with the second print. The first print blocks little of the light reflecting off the underlying iris and allows good blending with the natural eye because this layer is composed of an ink having lower pigment content than the second print. The second print design is composed of an "irregular border", facing toward the pupil. This irregular border provides structure that provides a transition from the limbal area into the iris area. The two layers superimposed provide the desired colored design, which covers and accentuates the wearers natural limbal ring and eye color more than a single layer by itself. On eye, the pattern provides an attractive design with perceived bigger and bolder eyes. It is also discovered that such cosmetic effects (i.e., enhancing a wearer's eye color and make them bolder while providing a very natural appearance) works particularly well for contact lens wearer having a dark-eye as well as many other eye colors.

It is further discovered that the above described contact lens further comprises a third print of a third color, wherein the third print is an inner starburst pattern of pearlescently colored elements, wherein the inner starburst pattern is located generally on the inside of and surrounded by the outer starburst pattern, wherein a jagged border separates the outer starburst pattern and the inner starburst pattern, wherein the pearlescently colored element comprises at least one pearlescent pigment in an amount sufficient to provide to the inner starburst pattern of the contact lens a desirable amount of pearlescent to impart a shiny appearance to a wearer's eye.

In one respect, the invention provides a colored contact lens, comprising a first print of a first color and a second print of a second color, wherein the first print is an annular ring of gradient dot matrix, wherein the second print comprises an outer starburst pattern and a limbal ring surrounding the outer starburst pattern, wherein the annular ring and the limbal ring have a substantially identical outer diameter and the annular ring has a larger inner diameter than that of the limbal ring, wherein the first color and the second color are different or the same, wherein the first print and the second print are concentric with the center of contact lens.

As well known in the art, a color is generally described mainly by the following inter-related terms: hue, chroma, intensity, saturation, luminance, brightness value and opacity.

The term "different colors" is intended to describe that two colors are different in at least one of hue, chroma, intensity, saturation, luminance, brightness, value, and opacity. The term "second color different from said first color" (or some similar language) as used herein is intended to mean that both colors are of totally different colors, such as blue and hazel; or that both colors are the same hue, but have different lightness, values such as light blue and dark blue.

The term "the annular ring and the limbal ring have a substantially identical outer diameter" as used here is intended to describe the difference between the outer diameter of the annular ring and the outer diameter of the limbal ring is less than 0.3 mm, preferably less than 0.2 mm, more preferably less than 0.1 mm.

The term "an annular ring of gradient dot matrix" is intended to mean gradually increase local colored dot coverage in a radial direction (from the center to the edge) of an annular ring by increasing the print density. For example, the larger number of printed colored dots within an area near the exterior periphery edge of an annular ring causes the appearance of a darker exterior periphery edge of the annular ring than the interior periphery edge of the annular ring. Alternately, while fixing the spacing of the center of each dot, the larger size of colored dots within an area near the exterior periphery edge of an annular ring causes the appearance of a darker exterior periphery edge of the annular ring than the interior periphery edge of the annular ring. Alternately, the print density can be decreased by removing printed area, such as by removing print from a high print density region (i.e. circular voids). The interior peripheral edge of an annular ring refers to an edge being closest to the center of the colored lens. The exterior peripheral edge of an annular ring refers to an edge being farthest to the center of the colored lens. Alternately, the gradient dot matrix can be composed of a consistent dot density.

The printed colored dots or void areas can have any shape, regular or irregular, such as circular, oval, triangular, square, hexagonal, elongated, etc. All colored dots or void areas can have similar or different shapes. Preferably, all printed dots or void areas have substantially similar shape. More preferably, all printed dots or void areas have circular shapes.

The range of dot sizes is preferably from 0.01 to about 0.5 mm. The spacing between dots is preferred from 0.01 to about 0.3 mm. Also, the removed printed areas are circles (i.e. circular voids) from 0.01 to about 0.3 mm, with spacing from 0.01 to 0.3 mm.

The term "limbal ring" is intended to mean an annular band of color that, when the lens is on-eye and centered, partially or substantially completely overlies the lens wearer's limbus area. The limbus area is the area of the eye located between the iris area and the sclera area. Preferably, the limbal ring substantially completely overlies the limbus area. The innermost border, or edge closest to the geometric center of the lens, of the limbal ring may be about 5 mm to about 12 mm, preferably about 6 to about 11.5 mm, even more preferably about 9 to about 11 mm, from the lens' geometric center. The ring may be of any suitable width and preferably is about 0.5 to about 2.5 mm in width, more preferably about 0.75 to about 1.75 mm in width, or even more preferably about 0.8 to about 1.25 mm in width.

The limbal ring surrounds an outer starburst pattern, wherein the limbal ring is comprised of a colorant, wherein the limbal ring has an interior peripheral edge and an exterior peripheral edge, wherein the exterior peripheral edge is substantially even, wherein the interior peripheral edge is uneven (or jugged or irregular) or substantially even.

The interior peripheral edge of a limbal ring refers to an edge being closest to the center of the colored lens. The exterior peripheral edge of a limbal ring refers to an edge being farthest from the center of the colored lens. The limbal ring partially or substantially completely overlies a lens wearer's limbal region when the lens is on-eye.

By having a colored limbal ring on the colored outer starburst pattern, a colored contact lens of the invention can allow an eye to appear more "youthful" to an ordinary viewer, if limbal ring is of a color similar to the natural color of the iris, or limbal ring is of a color the same as the natural color of the iris but having a lower lightness, or limbal ring is of a darker color than the natural color of the iris.

By having a colored limbal ring on the colored outer starburst pattern, a colored contact lens of the invention can define or emphasize the natural color of the iris.

The limbal ring can be comprised of any shaped pigmented areas, preferably, opaque dots. Preferred the limbal ring comprised of evenly spaced circular voids.

FIG. 1 as an example illustrates a prior art contact lens. It has a non-opaque pupil section 20 in the center of lens, and an annular iris section 21 surrounding the pupil section. For hydrophilic lenses, a transparent peripheral section 22 surrounds iris section 21. A colored, opaque, intermittent pattern is located over the entire iris section 21, as show in FIG. 1. The pattern leaves a substantial portion of the iris section within the interstices of the pattern non-opaque. The non-opaque areas of iris section 21 appear white in FIG. 1.

Figure 2:
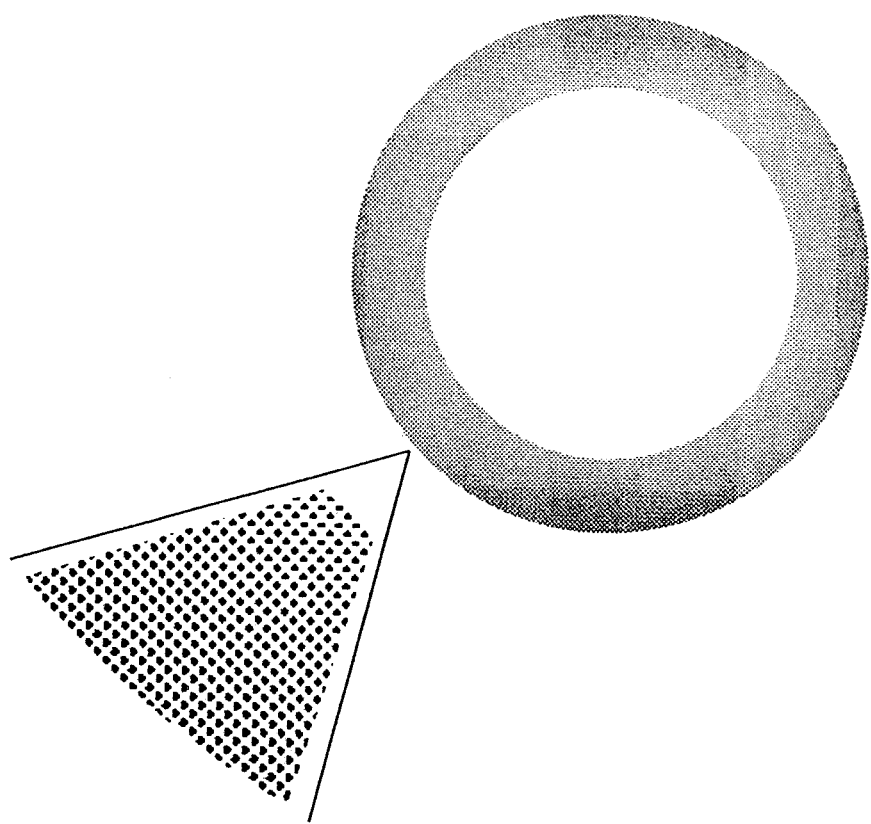
FIG. 2 illustrates a "first print pattern" which is a pattern of annular ring of a gradient dot matrix in accordance with the present invention.

FIG. 2 as an example schematically illustrates a "first print pattern" which consists of an annular ring of gradient dot matrix. The dots, preferably opaque dots, can have any shape, regular or irregular, such as circular, oval, triangular, square, hexagonal, elongated, etc. All dots can have similar or different shapes. Preferably, all dots have substantially similar shape. More preferably, all dots have circular shapes. The first print pattern is concentric with the center of a lens and has a substantially even exterior peripheral edge and a substantially even interior peripheral edge. The exterior peripheral edge can have a diameter of from about 12.5 mm to about 14 mm and the width of the annular ring is from about 1.2 mm to about 1.8 mm. The first print can be many colors, for example, blue, gray, brown, light blue, turquoise, violet, dark-violet, blue-violet, aqua, yellow or green. A preferred color for the preprint is black with violet tone. The dot coverage (print area) for the first print is from about 10 percent to about 35 percent, preferably from about 20 percent to about 30 percent, more preferably about 25 percent of the contact lens area excluding the outer transparent peripheral area (section 22 in FIG. 1). The outer transparent peripheral area is the area outside first print area and is un-printed area. This area corresponds to the sclera of the eye outer periphery.

Figure 3:
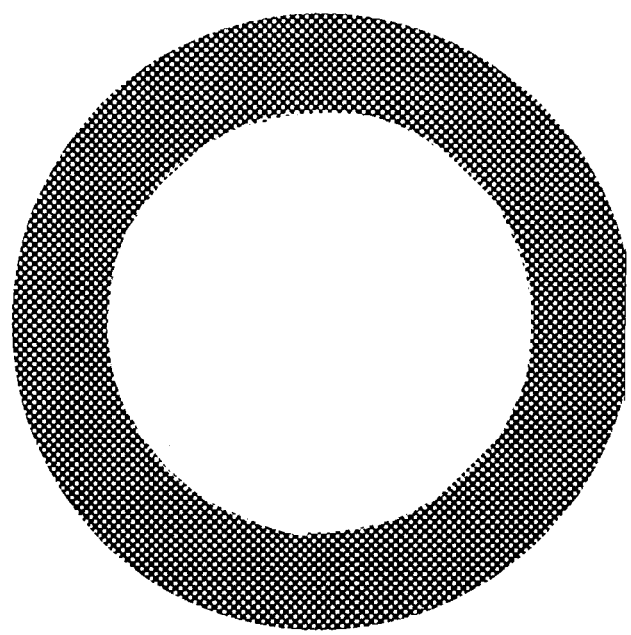
FIG. 3 illustrates a "limbal ring with evenly spaced circular voids" in accordance with the present invention.

FIG. 3 as an example schematically illustrates a "limbal ring with evenly spaced circular voids". The limbal ring consists of printed area with evenly spaced circular voids and is concentric with the center of a lens and has a substantially even exterior peripheral edge and a substantially even interior peripheral edge. The exterior peripheral edge can have a diameter of from about 12.5 mm to about 14 mm. The width of the limbal ring is about 0.5 mm to about 2.5 mm; preferable from 1.0 mm to 2.0 mm. Typically, the diameter of the circular voids is about 0.0 mm to about 0.5 mm, preferably from about 0.1 mm to about 0.4 mm, more preferably from 0.2 mm to 0.3 mm.

Figure 4:
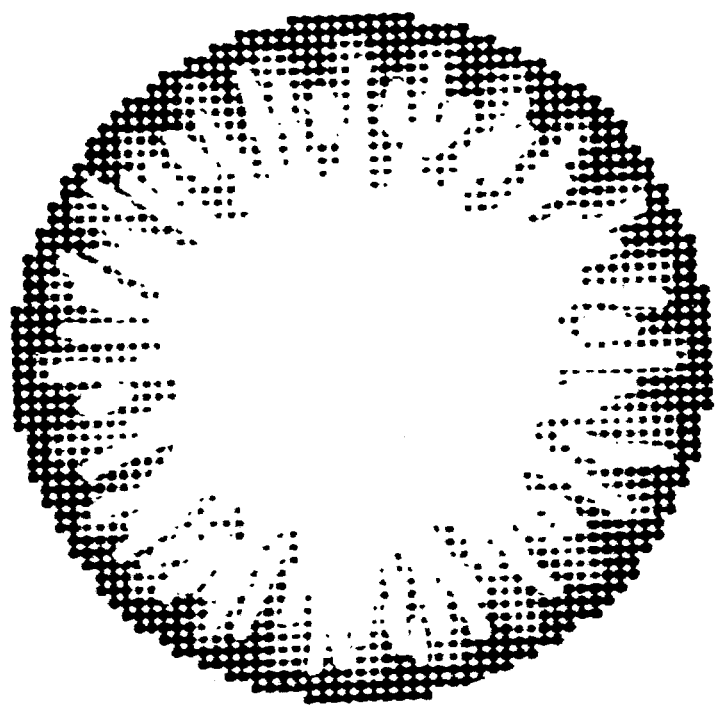
FIG. 4 illustrates an "outer starburst pattern" in accordance with the present invention.

FIG. 4 as an example schematically illustrates an "outer starburst pattern". The outer starburst pattern can be comprised of dots. The dots, preferably opaque dots, can have any shape, regular or irregular, such as circular, oval, triangular, square, hexagonal, elongated, etc. All dots can have similar or different shapes. Preferably, all dots have substantially similar shape. More preferably, all dots have circular shapes. The outer starburst pattern has an even or slightly uneven exterior peripheral edge and an uneven, jagged interior peripheral edge. The exterior peripheral edge of the outer starburst pattern can have a diameter of from 10 mm to about 13.5 mm. The innermost diameter of the interior jagged peripheral edge of the outermost starburst pattern (from innermost dot on one side to innermost dot on the other side) is located at about 5 mm or greater from the lens' geometric center, preferable from 5.5 mm to 7.5 mm, or more preferable from 6.0 mm to 7.0 mm.

Figure 5:
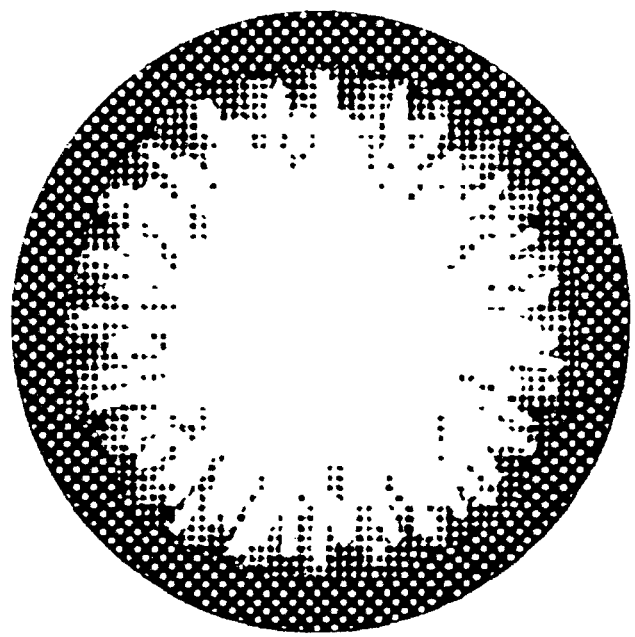
FIG. 5 illustrates a "second print" which is the overlay pattern of an "outer starburst pattern" and a "limbal ring pattern" in accordance with the present invention.

FIG. 5 as an example illustrates a "second print" which is a composite pattern of the "outer starburst pattern" and a "limbal ring". The dot coverage (print area) for the second print is from about 25 percent to about 45 percent, preferably from about 30 percent to about 40 percent, more preferably about 35 percent of the contact lens area excluding the outer transparent peripheral area (section 22 in FIG. 1). The outer transparent peripheral area is the area outside first print area and is un-printed area. This area corresponds to the sclera of the eye.

Figure 6:
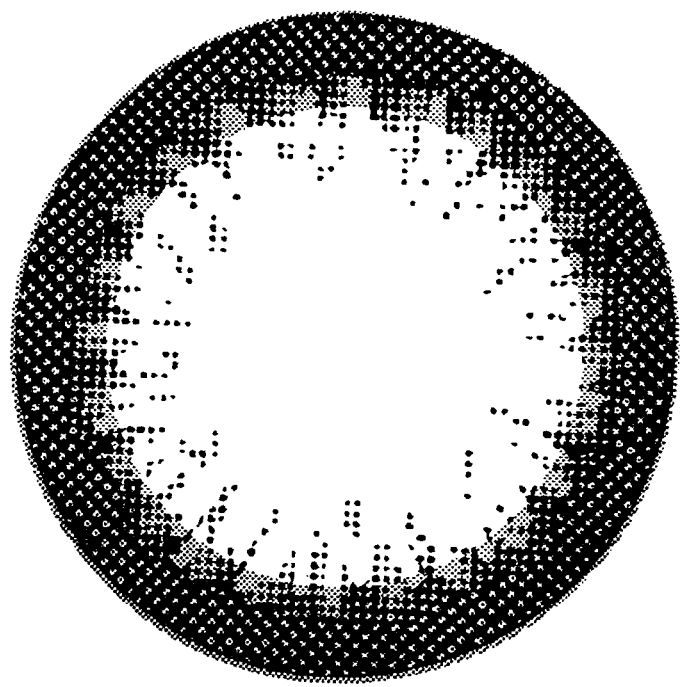
FIG. 6 illustrates the overlay pattern of the first print pattern and the second print pattern in accordance with the present invention.

FIG. 6 as an example schematically illustrates the overlay pattern of the first print pattern and the second print pattern. The dot coverage (print area) for the overlay print is from about 30 percent to about 50 percent, preferably from about 35 percent to about 45 percent, more preferably about 40 percent of the contact lens area excluding the outer transparent peripheral area (section 22 in FIG. 1). The outer transparent peripheral area is the area outside first print area and is un-printed area. This area corresponds to the sclera of the eye.

Figure 7:
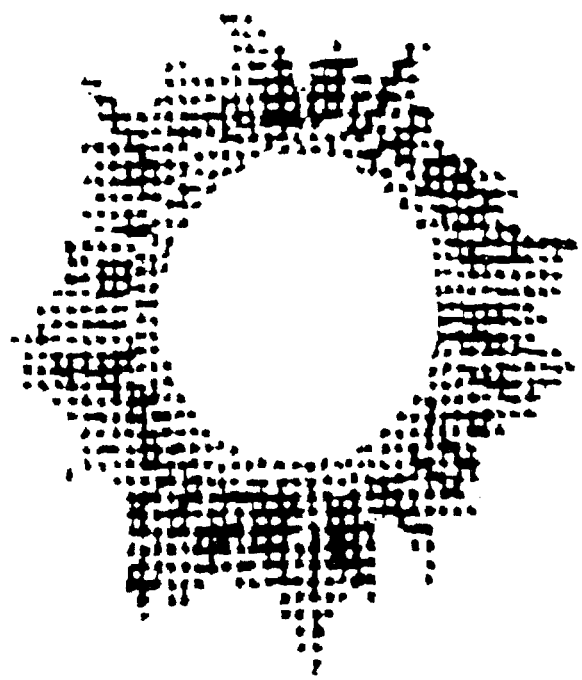
FIG. 7 illustrates an "inner starburst pattern" in accordance with the present invention.

FIG. 7 as an example schematically illustrates an "inner starburst pattern". The inner starburst pattern is a pattern comprising pearlescently colored dots, alternatively comprising non-pearlescent pigment color dots, located generally on the inside of and surrounded by the outer starburst pattern, wherein a jagged border separates the outer starburst pattern and the inner starburst pattern. This border need not be precise. Some dots of the outer starburst may be mixed in with dots of the inner starburst, so long there is a jagged border or border zone across with a noticeable change of color. The dots, preferably opaque dots, can have any shape, regular or irregular, such as circular, oval, triangular, square, hexagonal, elongated, etc. All dots can have similar or different shapes. Preferably, all dots have substantially similar shape. More preferably, all dots have circular shapes. The pearlescently colored dots comprise at least one pearlescent pigment in an amount sufficient to provide to the inner starburst pattern of the contact lens a desirable amount of pearlescence to impart a shine appearance to a wearers eye.

A preferred color for the inner starburst is hazel, but other colors to be used include yellow, yellow-green, brown, yellow-brown, gold and orange.

In accordance with the invention, the first print and the second print are superimposed to provide the desired colored design, which covers and accentuates the wearers natural limbal ring and eye color more than a single print by itself. The first print is printed with a first ink and the second print is printed with a second ink. The second ink has higher pigment content than the first ink by at least 20% to impart a higher opacity to the second print, preferably by at least 40%, more preferably by at least 60%. The percent of higher pigment in ink is calculated as follows:

Percent of higher pigment in second ink=[(percent pigment content in the second ink−percent pigment content in the first ink)/(percent pigment content in the first ink)]×100

The percent of pigment and each component in ink is by weight.

On eye, the pattern in accordance with the invention provides an attractive design with perceived bigger and bolder eyes.

A colored contact lens can be made by applying an ink directly onto a preformed contact lens. A preferred method for applying an ink onto a contact lens in accordance with this invention is through printing, for example, pad-transfer printing and/or inkjet printing using an ink, preferably a water-based ink.

An ink typically comprises at least one colorant, a binder polymer, and a solvent. An ink can optionally include a crosslinker, a humectant, a surfactant, a monomer, a polymerization initiator, an antimicrobial agent, an antioxidant agent, an anti-kogating agent, and other additives known in the art.

A colorant comprises at least one dye or preferably one pigment. Conventional and/or pearlescent pigments can be used in the invention.

A solvent can be water (water-based inks) or any appropriate organic solvent (organic solvent-based inks). Any known suitable solvents can be used, so long as they can dissolve the binder in the ink of the invention and aid in the stability of the colorant. Examples of preferred solvents include water, or water mixed with one or more co-solvent. Alternately, organic solvents such as alcohols, glycols, ketones, esters, methylethylketone, cyclopentanone, and cyclohexanone could be used.

"A binder polymer" refers to a crosslinkable polymer that comprises crosslinkable groups and can be crosslinked by a crosslinker or upon initiation by a chemical or physical means (e.g., moisture, heating, UV irradiation or the like) to trap or bind colorants onto or into a contact lens such as that term is known in the art.

The term crosslinkable groups is employed herein in a broad sense and is intended to encompass, for example, functional groups and photo crosslinkable or thermally crosslinkable groups, which are well-known to a person skilled in the art. It is well known in the art that a pair of matching crosslinkable groups can form a covalent bond or linkage under known reaction conditions, such as, oxidation-reduction conditions, dehydration condensation conditions, addition conditions, substitution (or displacement) conditions, free radical polymerization conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions. For example, an amino group is covalently bondable with aldehyde (Schiff base which is formed from aldehyde group and amino group may further be reduced); an hydroxyl group and an amino group are covalently bondable with carboxyl group; carboxyl group and a sulfo group are covalently bondable with hydroxyl group; a mercapto group is covalently bondable with amino group; or a carbon-carbon double bond is covalently bondable with another carbon-carbon double bond.

Exemplary covalent bonds or linkage, which are formed between pairs of crosslinkable groups, include without limitation, alkane (carbon-carbon single bond), alkene (carbon-carbon double bond), ester, ether, acetal, ketal, vinyl ether, carbamate, urea, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary crosslinkable groups include, without limitation, hydroxyl group, amine group, amide group, sulfhydryl group, —COOR (R and R' are hydrogen or $C_1$ to $C_8$ alkyl groups), halide (chloride, bromide, iodide), acylchloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimideester, hydroxysulfosuccinimideester, imidoester, hydrazine, axidonitrophenyl group, azide, 3-(2-pyridyldithio)proprionamide, glyoxal, aldehyde, epoxy, olefinically unsaturated radicals.

A binder polymer in the ink can be any polymer which is compatible with lens material. A binder polymer can be prepared by polymerization of monomers containing vinyl alcohol, vinyl butyral, vinylacetate, acrylicacid, methacrylic acid, hydroxy $C_1$ to $C_6$ alkylester of acrylicacid and methacrylic acid, amino $C_1$ to $C_8$ alkylester of acrylic and methacrylic acid, glycerol esters of acrylic and methacrylic acid, vinylpyrrolidone, vinylchloride, hydroxyethyl methacrylate, dimethylacrylamide, and the like. Mixtures of these different monomers could be made to form various copolymers. Other polymers could include various cellulosic resins, polyesters, polyurethanes, polyureas, or polyamides that have at least one crosslinkable group. Preferably, monomers used in preparing a binding polymer is the same as that for monomers used in making a lens.

An ink for printing a colored lens of the invention can be prepared according any known suitable methods. For example, first a solution of binding polymer and solvent is prepared and this solution is mixed with paste containing the colorant to form an ink.

Pad transfer printing is well known in the art (see. For example, U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

Any known suitable silicone pad can be used in the present invention. Silicone pads are commercially available. However, different pads could give different print qualities. A person skilled in the art will know how to select a pad for a given ink.

Clichés can be made of ceramics or metals (e.g., steel). Where a cliché is made of a steel, it would be desirable to neutralize the pH of a water-based ink (e.g., adjusted pH to 6.8~7.8) by adding a buffer (such as, for example, phosphate salts). Images can be etched into a cliché according to any methods known to a person skilled in the art, for example, by chemical etching or laser ablation or the like. It is also desirable to clean clichés after use using standard cleaning techniques known to a person skilled in the art, such as, for example, immersion in a solvent, sonication, or mechanical abrasion.

It is understood that either the anterior (convex) or posterior (concave) surfaces of the lens may be printed, but printing the anterior surface is presently preferred.

Printing the lens using an inkjet printing process is described in published US Patent Application Nos. 2001/0050753, 2001/0085934, 2003/0119943, and 2003/0184710, herein incorporated by references in their entireties.

In accordance with a preferred embodiment, a colored contact lens may further comprise a clear coating covering at least the colored area of a lens. A clear coating can be formed on the colored area by applying a layer of a clear polymerizable solution free of any colorant onto the lens surface with color prints and then polymerizing the layer of clear polymerizable solution. A clear coat may minimize leaching of a colorant and may enhance wearer's comfort.

Alternatively, a colored contact lens of the invention can be made according to a print-on-mold process similar to those described in U.S. Pat. No. 5,034,166 to Rawlings et al. (herein incorporated by reference). An ink can be applied first on the molding surface of one or both mold portions by using pad transfer printing (or pad printing) or inkjet printing to form a colored coat (with a color image). A colored coat can be applied on the molding surface defining the posterior (concave) surface of a contact lens or on the molding surface defining the anterior surface of a contact lens or on both mold portions. Preferably, a colored coat (with a color image) is applied on the molding surface defining the anterior surface of a contact lens.

Optionally, a transferable coating can be applied to a molding surface of a mold before applying the ink by pad transfer printing. A transfer coating is intended to describe a coating which can be detached from a molding surface of a mold and become integral with the body of a contact lens molded in the mold. A transferable coating can be applied to a molding surface of mold by any suitable techniques, such as, for example, spraying, printing, swabbing, or dipping. A transferable coating can be prepared from a solution comprising polymerizable components and free of any colorants. For example, a transferable coating with substantially uniform thickness (less than 200 microns) can be prepared by spraying a molding surface with a solution having the composition (without colorant) of an ink to be used or a solution of prepolymer or a lens-forming material to be used. This transferable coating can optionally be dried or cured to form a transferable clear film (without any pigment but optionally with dyes including reactive dyes). One or more colored patterns can then be printed on this transferable coating or film. By applying a transferable coating before printing, one can make a colored lens in which printed colored patterns are embedded just below a film derived from the transferable coating. Such a lens may be more comfortable for wearing and have much less susceptibility to colorant leaching out of the colored lens.

After printing an ink of the invention on a molding surface of a mold, the printed ink can be cured by UV or other actinic radiation to form a colored film in accordance with the invention. It is desirable that the printed ink is cured actinically to an extent to minimize loss of pattern definition of the colored coat resulted from subsequent filling of a lens-forming material.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

Any lens-forming materials can be used in the invention and is not presently considered a critical part of this aspect of the invention. Lens forming materials that are suitable in the fabrication of contact lenses are illustrated by numerous issued US patents and familiar to those skilled in the art. Preferred lens-forming materials are capable of forming hydrogels. A lens-forming material can comprise one or more prepolymers, optionally one or more vinylic monomers and/or macromers and optionally further include various components, such as photoinitiator, visibility tinting agent, fillers, and the like. It should be understood that any silicone-containing prepolymers or any silicone-free prepolymers can be used in the present invention.

A preferred group of lens-forming materials are prepolymers which are water-soluble and/or meltable as described above. It would be advantageous that a lens-forming material comprises primarily one or more prepolymers which are preferably in a substantially pure form (e.g., purified by ultrafiltration). Therefore, after crosslinking/polymerizing by actinic radiation, a contact lens may require practically no more subsequent purification, such as complicated extraction of unpolymerized constituents. Furthermore, crosslinking/polymerizing may take place solvent-free or in aqueous solution, so that a subsequent solvent exchange or the hydration step is not necessary.

A person skilled in the art will know well how to actinically or thermally cure the lens-forming material within the lens-forming cavity to form the contact lens.

In a preferred embodiment, where a lens-forming material is a solution, solvent-free liquid, or melt of one or more prepolymers optionally in presence of other components, reusable molds are used and the lens-forming material is cured actinically under a spatial limitation of actinic radiation to form a colored contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

In this case, the lens-forming material is put into a mold consisting of two mold halves, the two mold halves not touching each other but having a thin gap of annular design arranged between them. The gap is connected to the mold cavity, so that excess lens material can flow away into the gap. Instead of polypropylene molds that can be used only once, it is possible for reusable quartz, glass, or sapphire molds to be used, since, following the production of a lens, these molds can be cleaned and dried rapidly to effectively remove the uncrosslinked prepolymer and other residues, using water or a suitable solvent. Reusable molds can also be made of Topas® COC grade 8007-S10 (clear amorphous copolymer of ethylene and norbornene) from Ticona GmbH of Frankfurt, Germany and Summit, N.J. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced.

The two opposite surfaces (anterior surface and posterior surface) of a contact lens are defined by the two molding surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation. Such method of making contact lenses are described in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

A spatial limitation of actinic radiation (or the spatial restriction of energy impingement) can be effected by masking for a mold that is at least partially impermeable to the particular form of energy used, as illustrated in U.S. patent application Ser. No. 08/274,942 filed Jul. 14, 1994 and U.S. Pat. No. 6,627,124 (herein incorporated by reference in their entireties) or by a mold that is highly permeable, at least at one side, to the energy form causing the crosslinking and that has mold parts being impermeable or of poor permeability to the energy, as illustrated in U.S. patent application Ser. No. 10/732,566 filed Dec. 10, 2003, Ser. No. 10/721,913 filed Nov. 25, 2003 and U.S. Pat. No. 6,627,124 (herein incorporated by reference in their entireties). The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

It should be understood that an ink of the invention should have a good transferability of the colored coat from a mold to a contact lens and a good adhesion to the molded lens. The resultant colored contact lens is essentially smooth and continuous on the surface containing the color film.

The good transferability and adhesion may be resulted largely from interpenetrating network formation during curing of the lens-forming material in the mold. Without limiting this invention to any particular mechanism or theory, it is believed that the ink binders of the invention can form interpenatrating networks (IPN's) with the lens material of a hydrogel lens. Adhesion of an ink of the invention to the lens by IPN formation does not require the presence of reactive funtional groups in the lens polymer. The lens-forming material is crosslinked in the presence of crosslinked binder polymer in the colored film to form IPNs. It is understood that some (residual) ethylenically unsaturated groups in the binder polymer may not be consumed during curing of the colored coat to form the colored film. These residual ethylenically unsaturated groups may undergo crosslinking reaction to bind the binder polymer to the lens material during the curing of the lens-forming material in the mold.

It is also understood that adhesion between lenses and ink could be enhanced by direct linkage (bond formation) between binder polymer and lens polymer. For example, a binder polymer containing nucleophilic groups could undergo reactions with lens polymer that contains electrophilic groups such as epoxy, anhydride, alkyl halide and isocyanate. Alternatively one could bind ink to lenses by having electrophilic groups in the ink binder polymer and nucleophic groups in the lens polymer. Curable inks could also be made be incorporating both nucleophilic and electrophilic functionality into to binder polymer.

In another aspect, the invention encompasses a method for making a colored contact lens, comprising the steps of:
  (a) providing a preformed contact lens; and
  (b) applying a first print pattern of opaque colored dots of a first color onto a surface of at least one of the anterior and posterior surfaces of the contact lens,
  wherein the first print is an annular ring of gradient dot matrix,
  (c) applying a second print pattern of opaque colored dot of a second color onto the surface of the contact lens,
  wherein the second print comprises an outer starburst pattern and a limbal ring surrounding the outer starburst pattern, wherein the annular ring and the limbal ring have a substantially identical outer diameter and the annular ring has a larger inner diameter than that of the limbal ring, wherein the first color and the second color are different or the same, wherein the first print and the second print are concentric with the center of contact lens.

In a further aspect, the invention encompasses a method for making a colored contact lens, comprising the steps of:
  (a) providing a mold including a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces;
  (b) applying, by using pad-transfer or inkjet printing technique, a second print pattern of opaque colored dot of a second color to onto at least one of molding surfaces of a lens mold, wherein the second print comprises an outer starburst pattern and a limbal ring surrounding the outer starburst pattern, wherein the annular ring and the limbal ring have a substantially identical outer diameter and the annular ring has a larger inner diameter than that of the limbal ring,
  (c) applying, by using pad-transfer or inkjet printing technique, a first print pattern of opaque colored dots of a first color onto the surface of the mold,
  wherein the first print is an annular ring of gradient dot matrix,
  wherein the first color and the second color are different or the same, wherein the first print and the second print are concentric with the center of contact lens.

Any known suitable lenses made of any lens-forming material can be used to practice this invention. Preferably, hydrogel lenses or silicone-containing hydrogel lenses are used to practice this invention. Examples of preferred lenses include: without limitation, lenses described in Loshaek's U.S. Pat. No. 4,668,240 (incorporated herein by reference in its entirety); lenses prepared from a water-soluble crosslinkable poly(vinylalcohol) prepolymer as described in U.S. Pat. Nos. 5,583,163 and 6,303,687 (incorporated by reference in their entireties); lenses made from a water-soluble crosslinkable polyurea prepolymer as described in U.S. Pat. No. 6,479,587 (herein incorporated by reference in its entirety) and a co-pending U.S. patent application No. 60/525,100 filed Nov. 25, 2003 entitled "Crosslinkable polyurea prepolymers" (herein incorporated by reference in its entirety); and the like. It is understood that any commercial available lenses, such as, for example, FOCUS DAILIES®, ACUVUE®, etc., can be used to practice this invention.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

EXAMPLES

Different colors of black, dark violet are prepared as shown in Table 1. The percentage of each component is by weight.

TABLE 1

| Ink | Nelfilcon[1] | Black iron oxide | Carbazole violet | PCN Blue | PCN green | Surfactant[2] | $Na_2PO_4$ | Irgacure® 2959 |
|---|---|---|---|---|---|---|---|---|
| BK-1 | 84.3 | 14.0 | | | | 0.1 | 0.2 | 1.4 |
| BK-2 | 89.8 | 7.0 | 1.5 | | | 0.1 | 0.2 | 1.4 |

TABLE 1-continued

| Ink | Nelfilcon[1] | Black iron oxide | Composition (% by weight) | | | | | |
|---|---|---|---|---|---|---|---|---|
| | | | Carbazole violet | PCN Blue | PCN green | Surfactant[2] | Na$_2$PO$_4$ | Irgacure ® 2959 |
| BK-3 | 89.8 | 7.0 | | 1.5 | | 0.1 | 0.2 | 1.4 |
| BK-4 | 90.7 | 6.5 | | 1.5 | | 0.1 | | 1.2 |
| BK-5 | 83.2 | 15.5 | | | | 0.1 | | 1.2 |

[1]An aqueous solution of nelfilcon (30% by weight of nelfilcon and 70% by weight of water)
[2]Surfynol ® 420 surfactant These inks are used to print on the glass female mold halves of reusable molds shown in FIGS. 2 and 6 according to pad transfer printing technique. The male mold halves are made of quartz. The inks are cured under a Hamamatsu lamp with a fiber optic probe and a 297 nm cut-off filter. The light is passed through a condenser (f=22.5 mm), with a distance 40 mm from the condenser to the mold. UVB light greater than 5 mW/cm$^2$ is used for 2 seconds, as measured by a Groebel detector. The intensity is monitored by measuring the aperture of the Hamamatsu lamp.

After curing the printed ink on female mold halves, a nelfilcon solution containing about 30% nelfilcon and 0.1% Irgacure 2959 is dispensed onto the printed female mold halves by using an EFD automatic dispenser (4 bar, 1.2 sec). The female mold halves then mate with corresponding male mold halves and are closed. The nelfilcon is UV cured with a Dr. Groebel lamp, with a 303 nm (50% transmission) cut-off filter installed in the condenser. The molds are opened and resultant colored contact lenses are stored in DI water until use.

Colored contact lenses are examined by imaging under back-lighting conditions to emphasize contrast. Imaging is performed using a parafocal zoom lens (0.7×-4.5×, VZM-450, Edmund Scientific) with a 0.5× supplemental lens. A Sony XC-999 camera connected to a Matrox Meteor 2 frame grabber allowed images to be taken with Archive4Images (A4I) software (Aquinto) or other image softwares. The A4A software automatically exports the images to Microsoft Word, which can be examined for print quality and resolution.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A colored contact lens, comprising
   a limbal ring pattern color print, wherein the limbal ring pattern with evenly spaced circular voids;
   an inner starburst pattern color print, wherein the inner starburst pattern is located generally on the inside of limbal ring pattern,
   wherein the limbal ring pattern color print and the inner starburst pattern color print are concentric with the center of contact lens.

2. The colored contact lens of claim 1, wherein the interior peripheral edge of the limbal ring is at a diameter of about 5 mm to about 12 mm from the lens' geometric center.

3. The colored contact lens of claim 1, wherein the limbal ring has a width of from about 0.5 to about 2.5 mm.

4. The colored contact lens of claim 3, wherein the limbal ring has a width of from about 0.8 mm to about 1.25 mm.

5. The colored contact lens of claim 1, wherein the limbal ring pattern print has a color selected from a group consisting of black, dark-gray, dark-brown and dark-blue.

6. The colored contact lens of claim 1, wherein the inner starburst pattern print has a color selected from a group consisting of hazel, yellow, yellow-green, brown, yellow-brown, gold and orange.

7. The colored contact lens of claim 1, wherein the inner starburst pattern comprising pearlescently colored, wherein the pearlescently colored element comprises at least one pearlescent pigment in an amount sufficient to provide to the inner starburst pattern of the contact lens a desirable amount of pearlescent to impart a shine appearance to a wearer's eye.

8. A method for making a colored contact lens, comprising the steps of:
   (a) providing a preformed contact lens; and
   (b) applying a limbal ring print pattern of opaque colored dots onto a surface of at least one of the anterior and posterior surfaces of the contact lens,
   wherein the limbal ring print pattern with evenly spaced circular voids,
   (c) applying an inner starburst print pattern of opaque colored dot onto the surface of the contact lens, wherein the inner starburst print pattern is located generally on the inside of limbal ring pattern, wherein the limbal ring print and the inner starburst print are concentric with the center of contact lens.

9. The method of claim 8, wherein the steps (b) and (c) of applying are carried out according to a pad-transfer or inkjet printing process.

10. The method of claim 8, wherein the method further comprises forming a clear coat covering at least part of the surface of the contact lens.

11. A method for making a colored contact lens, comprising the steps of:
    (a) providing a mold including a first mold half having a first molding surface defining the anterior surface of a contact lens and a second mold half having a second molding surface defining the posterior surface of the contact lens, wherein the first and second mold halves are configured to receive each other such that a contact lens forming cavity is formed between the first and second molding surfaces;
    (b) applying, by using pad-transfer or inkjet printing technique, an inner starburst print pattern of opaque colored dot onto at least one of molding surfaces of a lens mold, wherein the inner starburst pattern is located generally on the inside of limbal ring pattern, (c) applying, by using pad-transfer or inkjet printing technique, a limbal ring print pattern of opaque colored dots onto the surface of the mold, wherein the limbal ring print and the inner starburst print are concentric with the center of contact lens.

12. The method of claim 11, wherein a transferable clear coating is applied onto the molding surface of the mold before the step (b).

* * * * *